United States Patent
Kumar et al.

(10) Patent No.: US 9,807,269 B2
(45) Date of Patent: Oct. 31, 2017

(54) SYSTEM AND METHOD FOR LOW LIGHT DOCUMENT CAPTURE AND BINARIZATION WITH MULTIPLE FLASH IMAGES

(71) Applicant: Xerox Corporation, Norwalk, CT (US)

(72) Inventors: Jayant Kumar, Webster, NY (US); Raja Bala, Pittsford, NY (US); Martin S. Maltz, Rochester, NY (US); Phillip J Emmett, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/713,077

(22) Filed: May 15, 2015

(65) Prior Publication Data
US 2016/0337545 A1  Nov. 17, 2016

(51) Int. Cl.
*H04N 1/024* (2006.01)
*H04N 1/387* (2006.01)
(Continued)

(52) U.S. Cl.
CPC ......... *H04N 1/00997* (2013.01); *G06T 5/007* (2013.01); *G06T 5/50* (2013.01);
(Continued)

(58) Field of Classification Search
CPC ............................ H04N 1/00997; G06T 5/007
(Continued)

(56) References Cited

U.S. PATENT DOCUMENTS 6,822,690 B2 * 11/2004 Iida .......................... H04N 1/40
348/362
7,136,537 B2 * 11/2006 Pilu .................... H04N 1/40093
358/3.26
(Continued)

FOREIGN PATENT DOCUMENTS

JP    2001268323 A  *  9/2001
JP    2009147806 A  *  7/2009

OTHER PUBLICATIONS

U.S. Appl. No. 14/011,028, filed Aug. 17, 2013, Maltz et al.
(Continued)

*Primary Examiner* — Cheukfan Lee
(74) *Attorney, Agent, or Firm* — Fay Sharpe LLP (57) ABSTRACT

The embodiments include systems and methods for guiding a user to capture two flash images of a document page, and selectively fuse the images to produce a binary image of high quality and without loss of any content. Each individual image may have an FSR where the content is degraded/lost due to the flash light. The idea is to first guide the user to take two images such that there is no overlap of flash-spots in the document regions. The flash spots in both images are detected and assessed for quality and extent of degradation in both images. The image with lower degradation is chosen as the primary image and the other image as secondary, to minimize fusing artifacts. The region in secondary image corresponding to the FSR in the primary is aligned to the primary region using a multiscale alignment technique. The primary image and aligned FSR are binarized and fused in
(Continued)

the vicinity of the flashspot in the primary using an intelligent technique that minimizes fusion boundary artifacts such as cutting of characters and words.

18 Claims, 7 Drawing Sheets

(51) Int. Cl.
| | | |
|---|---|---|
| *H04N 1/00* | (2006.01) | |
| *G06T 5/00* | (2006.01) | |
| *G06T 5/50* | (2006.01) | |
| *H04N 1/028* | (2006.01) | |

(52) U.S. Cl.
CPC ... *H04N 1/028* (2013.01); *G06T 2207/20221* (2013.01); *G06T 2207/30176* (2013.01)

(58) Field of Classification Search
USPC ....... 358/473, 474, 450, 453, 463, 538, 522, 358/527; 382/282, 284, 168
See application file for complete search history.

(56) References Cited

U.S. PATENT DOCUMENTS

| | | | | |
|---|---|---|---|---|
| 7,158,099 | B1 * | 1/2007 | Berube | G03B 15/03 345/9 |
| 7,630,002 | B2 * | 12/2009 | Jenkins | G06F 3/0418 345/173 |
| 8,203,764 | B2 * | 6/2012 | King | G06T 5/50 358/3.26 |
| 8,743,462 | B2 * | 6/2014 | Freier | G02B 19/0023 359/596 |
| 2011/0013001 | A1 * | 1/2011 | Craven-Bartle | G06F 3/03545 348/61 |
| 2012/0268626 | A1 * | 10/2012 | Lu | H04N 5/2625 348/241 |
| 2012/0320262 | A1 * | 12/2012 | Chung | H05B 37/0272 348/370 |
| 2013/0271796 | A1 * | 10/2013 | Landa | H04N 1/387 358/463 |
| 2013/0335787 | A1 * | 12/2013 | Kawata | H04N 1/02815 358/474 |
| 2014/0176735 | A1 * | 6/2014 | Short | H04N 1/00267 348/207.1 |
| 2015/0063720 | A1 * | 3/2015 | Maltz | G06T 5/007 382/284 |
| 2015/0070737 | A1 * | 3/2015 | Hirata | H04N 1/6044 358/504 |
| 2015/0181072 | A1 * | 6/2015 | Kasahara | H04N 1/19594 358/475 |

OTHER PUBLICATIONS

Varjo, S., Hannuksela, J., Silvén, O., & Alenius, S.: "Mutual Information Refinement for Flash-No-Flash Image Alignment", Adv. Concepts for Intelligent Vision Systems, pp. 405-416, 2011.

Zhu, X., and Peyman M.: "Automatic Parameter Selection for Denoising Algorithms Using a No-Reference Measure of Image Content." Image Processing, IEEE Transactions on 19.12 (2010): 3116-3132.

Sauvola, J., and Matti P.: "Adaptive Document Image Binarization." Pattern Recognition 33.2 (2000): 225-236.

Pavlidis, T.: "Threshold Selection Using Second Derivatives of the Gray Scale Image.", Document Analysis and Recognition, Second International Conference on, pp. 274-277, 1993.

Savakis, A. E.: "Adaptive Document Image Thresholding Using Foreground and Background Clustering." Proceedings of International Conference on Image Processing, pp. 785-789, 1998.

Su, B., Lu, S., & Tan, C. L.: "Robust Document Image Binarization Technique for Degraded Document Images." IEEE Transactions on Image Processing, 22(4), 1-10, 2013.

Chou, C. H., Wen-Hsiung L., and Chang, F.: "A Binarization Method with Learning-Built Rules for Document Images Produced by Cameras." Pattern Recognition 43.4: 30 pgs, 2010.

Gatos, B., Pratikakis, I., and Perantonis, S.J.: "Adaptive Degraded Document Image Binarization." Pattern Recognition 39.3 (2006): 317-327.

Kasar, T., Kumar, J. and Ramakrishnan, A. G. "Font and Background Color Independent Text Binarization." International workshop on camera-based document analysis and recognition, Medical Intelligence and Language Engineering Laboratory, Indian Institute of Science, Bangalore, India pp. 3-9, 2007.

Bukhari, S. S., Faisal S., and Breuel, T. M.: "Adaptive Binarization of Unconstrained Hand-Held Camera-Captured Document Images." J. UCS 15.18 (2009): 3343-3363.

Petschnigg, G., Szeliski, R., Agrawala, M., Cohen, M., Hoppe, H., & Toyama, K.: "Digital Photography with Flash and No-Flash Image Pairs", ACM transactions on graphics (TOG), vol. 23, No. 3, pp. 664-672, 2004.

Agrawal, A., Raskar, R., Nayar, S. K., & Li, Y.: "Removing Photography Artifacts Using Gradient Projection and Flash-Exposure Sampling", ACM Transactions on Graphics (TOG),vol. 24, No. 3, pp. 828-835, 2005.

Alenius, S., & Bilcu, R.: "Combination of Multiple Images for flash Re-Lightning", Communications, Control and Signal Processing, 3rd International Symposium on pp. 322-327. 2008.

Eisemann, E., and Durand, F.: "Flash photography enhancement via intrinsic relighting." ACM transactions on graphics (TOG) 23.3 (2004): 673-679.

Liu, Y., and Srihari, S. N. "Document Image Binarization Based on Texture Features." Pattern Analysis and Machine Intelligence, IEEE Transactions on 19.5 (1997): 540-544.

Zhu, Y., Chunheng W., and Ruwei D. "Document Image Binarization Based on Stroke Enhancement." Pattern Recognition, International Conference on. vol. 1. pp. 955-958, 2006.

\* cited by examiner

FIG. 1

Coubertin founded the International Olympic Committee (/
body of the Olympic Movement, with the Olympic Chart ing the 20th and 2   resulted in several ch
include the crea   ames for ice and win
cal disability, a  10  Games for teenage
hic, political, and   s of the 20th century
nern, as envisio   o allow participation o
a mass, media   e of corporate spor
rs led to the cance  1916, 1940, and 1944, G
tion in the 1980 and 1984 Games.

nal,sports federations (IFS), National Olympic Committees

FIG. 2A

Coubertin founded the International Olympic Committee (/
body of the Olympic Movement, with the Olympic Chart ing the 20th and 21st centuries has resulted in several ch
include the creation of the Winter Games for ice and win
cal disability, and the Youth Olympic Games for teenage
hic, political, and technological realities of the 20th century
nern, as envisioned by Coubertin, to allow participation o
a mass, media created the issue of corporate spor
rs led to the cancellation of the 1916, 1940, and 1944, G
tion in the 1980 and 1984 Games.

nal,sports federations (IFS), National Olympic Committees

SYSTEM AND METHOD FOR LOW LIGHT DOCUMENT CAPTURE AND BINARIZATION WITH MULTIPLE FLASH IMAGES

CROSS REFERENCE TO RELATED PATENTS AND APPLICATIONS

U.S. patent application Ser. No. 14/011,028, filed Aug. 27, 2013, by Martin S. Maltz et al., and entitled "Flash/No-Flash Imaging for Binarization", is incorporated herein by reference in its entirety.

TECHNICAL FIELD

The presently disclosed embodiments are directed to image capture systems. Ambient light is supplemented with a flash illumination for enhanced recognition of the captured image. More particularly, the embodiments are directed to recognition and compensation by substitution for image portions obscured by the flash illumination.

BACKGROUND

Mobile devices such as smartphones and tablets are being increasingly used to capture images of documents such as tax forms, insurance claims, bank transactions, receipts, etc. One important function in such applications is the binarization that converts a color or grayscale document image to a bi-tonal image. Binarization can significantly reduce image storage size, and is also a precursor for most optical character recognition (OCR) algorithms. While considerable strides have been made in document image binarization, significant challenges remain in the scenario of mobile capture, wherein images can be captured under a variety of environmental conditions. A common example is capture under low-light conditions that can produce images of low contrast and signal-to-noise ratio. Binarization of such images results in broken, fragmented, or connected characters that result in poor readability and OCR performance. The use of supplemental illumination to ambient light such as a camera flash will usually significantly improve overall capture quality. However a strongly directed flash illumination often produces a specular reflection resulting in a "flash spot" 10 (FIG. 2A) wherein the printed content is no longer discernable. This artifact may result in the loss of a very critical piece of information in a document (for example the monetary amount on a check). So in low-light environments, the result can be an image with low contrast and noise, or a bright image with a hot-spot where content is unreadable.

Prior known methods to solve the problems include capturing a pair of images, one with and one without flash, in rapid succession. The two images are aligned, binarized, and fused in the vicinity of the flash spot region ("FSR"). Fusion is such that the flash image is retained everywhere except in the FSR where content from the no-flash image is incorporated. This method does considerably improve output quality under low-light conditions. However one limitation is that image quality within the FSR is only as good as that of the no-flash image. However, if the quality of no-flash image is not good then the fused image exhibit artifacts such as changed stroke width, broken-characters, noise and the overall experience of reading and using the document is not good. It is preferred to have fusion in such a way that the blended region exhibits similar structural characteristics as the remainder of the document, and there is a smooth transition between different regions of document in terms of quality. Where strong differences in the binarized versions of flash and no-flash images occur, the result is visually disturbing transitions in the vicinity of the FSR. There is thus a need for an improved system that can overcome these problems.

SUMMARY

The embodiments include systems and methods for guiding a user to capture two flash images of a document page, and selectively fuse the images to produce a binary image of high quality and without loss of any content. Each individual image may have an FSR where the content is degraded/lost due to the flash light. The idea is to first guide the user to take two images such that there is no overlap of flash-spots in the document regions. The flash spots in both images are detected and assessed for quality and extent of degradation in both images. The image with lower degradation is chosen as the primary image and the other image as secondary, to minimize fusing artifacts. The region in secondary image corresponding to the FSR in the primary is aligned to the primary region using a multiscale alignment technique. The primary image and aligned FSR are binarized and fused in the vicinity of the flashspot in the primary using an intelligent technique that minimizes fusion boundary artifacts such as cutting of characters and words. The result is a binary image that does not have flash artifacts, since the FSRs in the two images are non-overlapping. Since both images are taken under similar flash condition, the quality and characteristics of content are very similar even after binarization. This produces an image with smooth transitions between original content and fused portion, undetectable to the human eye.

The disclosed embodiments thus include a method and system for low light image capture of a document image using a plurality of flash images. A first image of a document is captured using a supplemental light source wherein the first image has a first flash spot and a first flash spot region. A second image of the document is captured with a supplemental light source wherein the second image has a second flash spot spaced in the document from the first flash spot. The first and second images are fused for an alignment of the first and second images to form a fused image wherein the first flash spot region is replaced in the fused image with a corresponding portion of the second image.

In accordance with other features of the embodiments, the method includes guiding of the capturing to suggest a sufficient spacing of the first flash spot from the second flash spot.

The embodiment further includes assessing image degradation in the first flash spot region and a second flash spot region to determine a primary image as one of the first and second images having lower image degradation. The lower image degradation image is the first image and the other is the secondary image.

DETAILED DESCRIPTION

The subject embodiments include methods and systems for selectively fusing two flashed images of the same document page. Each individual image may have a flash spot where the content is degraded/lost due to the flash light. The embodiments comprise guiding a user to take two images such that there is no overlap of flash-spots in any document region. The flash spots are then accurately detected in both images and the quality and extent of degradation in both images is assessed. The image with lower degradation is chosen as a primary or first image and the other image as a second or secondary image, to minimize fusing artifacts. The region in the secondary image corresponding to the FSR in the primary is aligned to the primary region using a multiscale alignment technique. The primary image and aligned FSR are binarized and fused in the vicinity of the flash-spot in the primary using an intelligent technique that minimizes fusion boundary artifacts such as cutting of characters and words. The result is a binary image that does not have flash artifacts, since the FSR content from the other image is selectively incorporated. Since both images are captured under similar flash conditions, the quality and characteristics of content are very similar (even after binarization). This produces an image with smooth transition between original content and fused portion, undetectable to the human eye.

Figure 1:
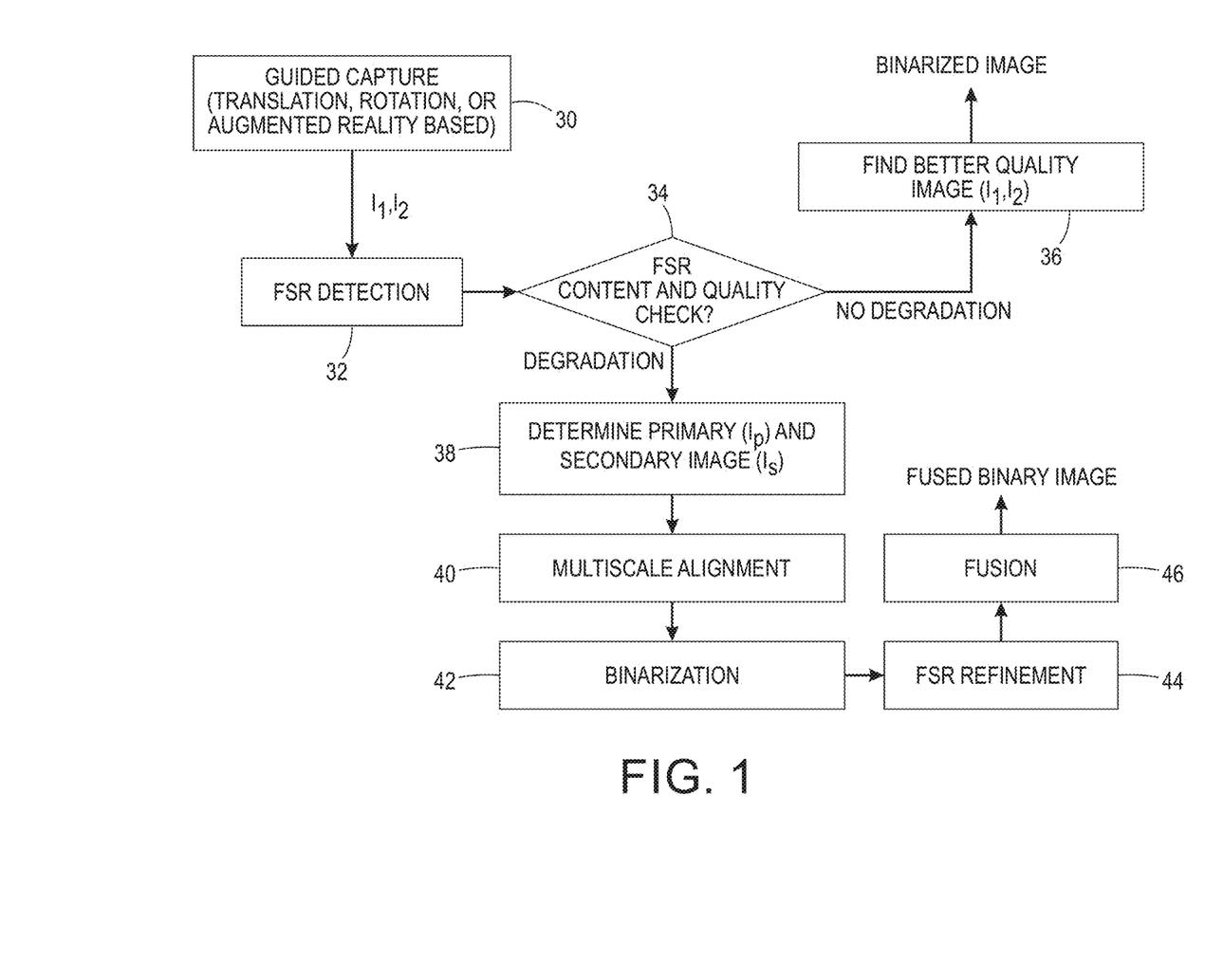
FIG. 1 is block diagram/flowchart of an embodiment.
Figure 2A:
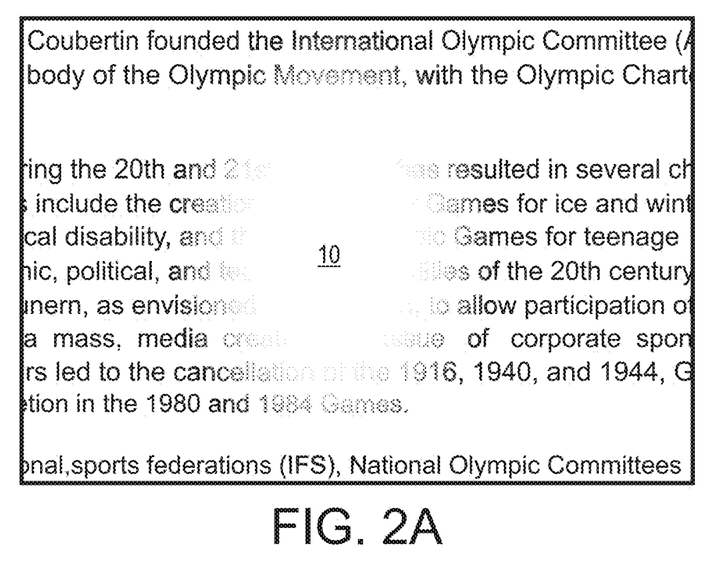
FIG. 2A shows a document wherein a flash spot region is shown and FIG. 2B shows the same captured image without flash.
Figure 2B:
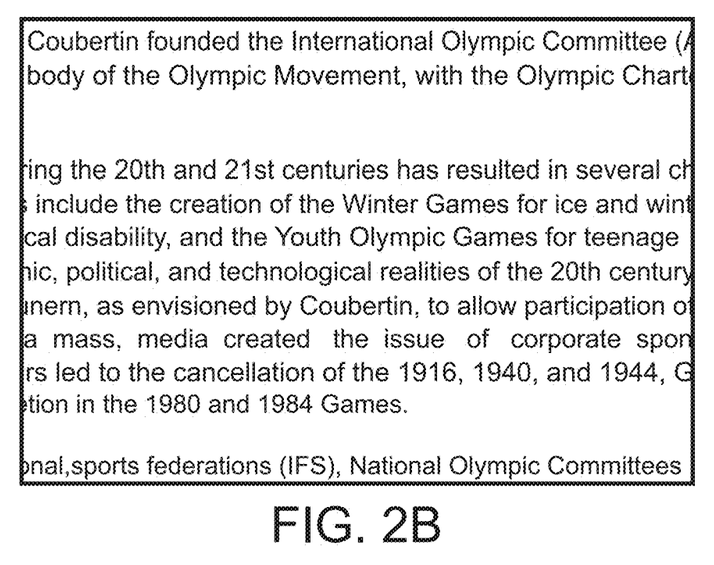
Figure 3A:
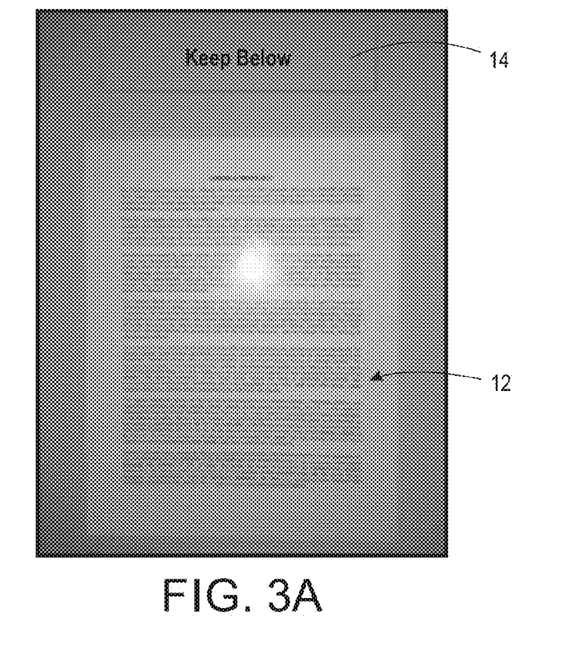
FIGS. 3A and 3B show the same document being captured with different, non-overlapping flashspot regions.
Figure 3B:
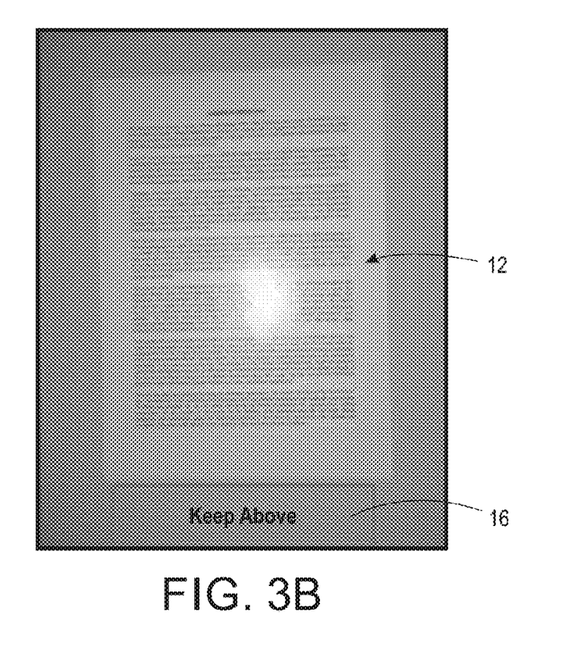

More particularly, with reference to FIGS. 2A and 2B, document content that is clearly shown in FIG. 2B and which should be captured during the capturing process is lost in the flash spot region 10 shown in FIG. 2A. To recover the lost data of the FSR, a guided capture of multiple flash images of the document is implemented. FIGS. 3A and 3B illustrate how a user can be guided to take two photos of a document page 12. First, a user is asked to keep the document below the guide box 14 and shown as a viewable preview enabled by the capturing device (e.g., a smartphone camera). In the second capture of FIG. 3B, the user is asked to keep the document 12 above the box 16. A flash spot detection and localization processor module 32 (FIG. 1) checks whether there is an overlap in the flash spot regions of the document in the first and second captures to make sure that an ultimately fused image does not lose any content. Thus the first step in the subject embodiments is the guided capture 30 of multiple flash images of the same document in a manner that there is no overlap in the merged FSRs within the document. One approach to avoid overlap can be achieved by displaying the rectangular boxes in the preview as shown in FIGS. 3A and 3B. The user is asked to keep the document below and above the boxes, respectively. This approach requires minimal user training and produces a pair of images with non-overlapping FSRs and with a high probability of successful fusing. Since the flash spot detection module 32 operates relatively fast compared to the user's action, the FSR in the first image of FIG. 3A can be estimated within fractions of seconds and depending on the size of the FSR therein, the needed translation of the FSR in the second capture to avoid overlap can be computed. Then the second box 16 is displayed based on this analysis for the second capture. FIG. 3B illustrates how the FSR in the second captured image is located by following the suggested guide in a location which does not have an overlap with the FSR shown in FIG. 3A.

Figure 4A:
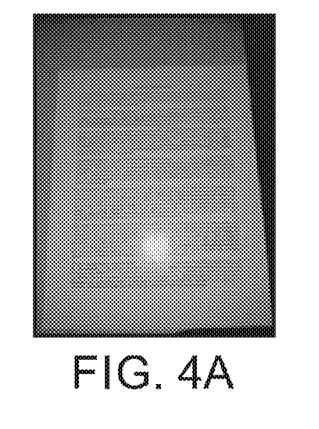
FIGS. 4A, 4B, and 4C shows an alternative selective guidance flash spot region movement by rotating the capturing device.
Figure 4B:
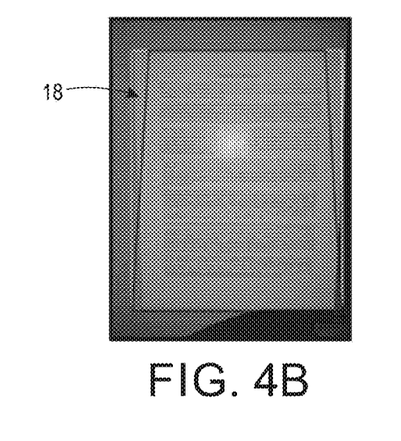
Figure 4C:
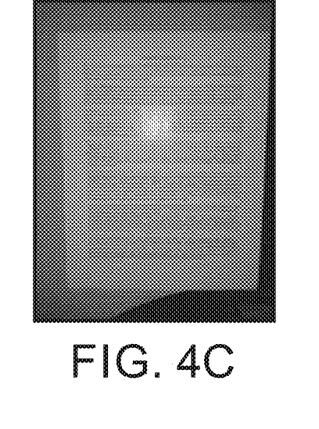

Another alternative method for guidance capture is one that prompts the user to rotate or orient the smartphone at different angles from one capture to the next so that the FSRs are at different locations. With reference to FIGS. 4A, 4B and 4C, after the first image has been captured FIG. 4A, the flash spot detection module 32 can localize a spot and guide the user to rotate the phone to take another shot which produces an image with a non-overlapping FSR (FIG. 4C). The guidance can use an overlay in the capture device preview display and show a geometrically distorted parallelogram 18 and ask the user to fit it to the document by rotating the phone (FIG. 4B). The result is the FSR being translated to what is shown in FIG. 4C.

Yet another guided capture method comprises an augmented reality (AR) based approach (not shown) which involves the following steps:

(1) capture the first image to do an estimation of the FSR; and (2) compute an alternative geometry that avoids the same FSR. The alternative geometry is suggested to the user via an AR guidance in a number of ways, for example
  (a) overlay a semi-transparent version of the first image on the screen distorted for the desired geometry; or
  (b) real time border detection where document borders are overlayed in one color (e.g., red) and switched to another color (e.g., green) when the desired geometry is achieved.

In yet another guided capture approach a slow scan can be employed from the top to the bottom of the document wherein the app on the capture device will prompt the user twice to stop for respective captures.

After the multiple images have been captured, a border detection and geometric correction method is implemented so that the captured images are analogous and the FSRs can be compared in contrast.

Figure 5A:
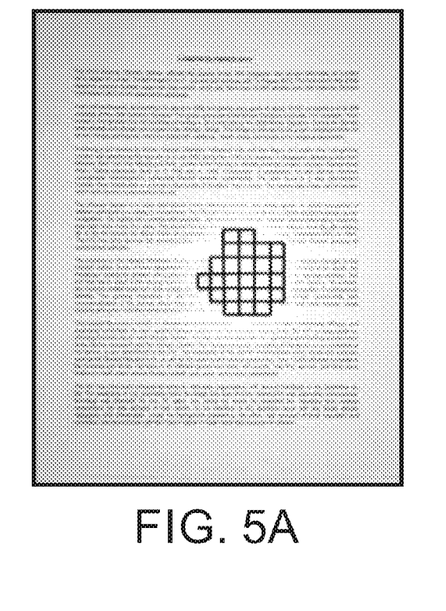
FIGS. 5A and 5B shows processing techniques for distinguishing a primary captured imaged from a secondary captured image.
Figure 5B:
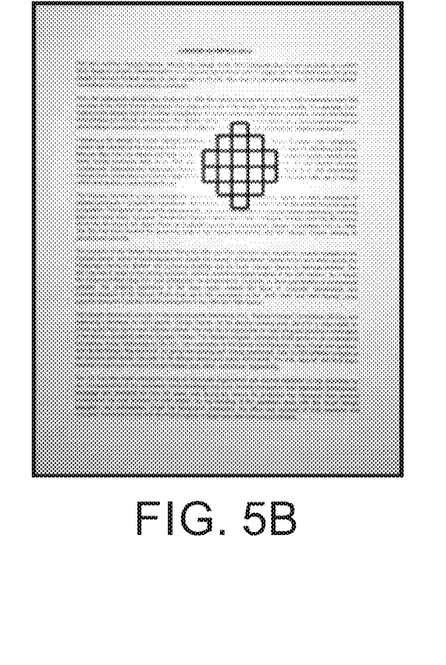

The respective FSRs in the captured images are then localized, and checked for content and quality 34 (FIG. 1) for purposes of insuring both accurate and computationally efficient image fusion. In order to localize a FSR, a two-pass window-based approach is employed. In the first pass, the number of pixels within a sliding window with brightness greater than a threshold is counted. This threshold is the p-th percentile of brightness values over the entire flash image. In the first pass, p is set to a high value ($99^{th}$ percentile) to capture very bright windows and in the second pass, p is set to a lower value ($98^{th}$ percentile) and a window is selected only if it is adjacent to a selected window in the first pass (FIGS. 5($a$) and 5($b$)). This helps in accurately localizing the FSR while being computationally efficient.

Additional logic is employed within the FSR to insure that two criteria are met, that (1) there is significant loss in content in each of the two FSRs, and (2) there is sufficient content in one image that can be transferred to the other. This takes care of cases where the FSR happens to be in a blank part of the image, where the capture is such that the flash does not noticeably degrade document content. In such cases, multi-flash fusion is not performed and the image with lower degradation is found, binarized and presented 36 to the user. When degradation occurs, a gradient-based image content measure is computed for each window within the FSR of both $I_{f1}$ and $I_{f2}$. Horizontal and vertical gradients $G_x$ and $G_y$ are computed and accumulated into an N×2 matrix M, where N is the number of pixels in the window. Next the Singular Value Decomposition (SVD) of M is computed. If $s_1$ and $s_2$ are singular values (s1≥s2) of M, a measure of image content is computed using the Eqn. 1:

$$q = \frac{s_1 - s_2}{s_1 + s_2} s_1$$

The q scores are summed within the FSR to produce a final measure $q_{fsr}$. In order to perform the fusion, it is required that $q_{fsr}$ within $I_{f1}$ and $I_{f2}$ is less than a threshold. The threshold is determined empirically.

Once it is determined that there is no overlap in the FSR of two images, the first and second images are established as a primary (master) and a secondary image 38. The image with smaller FSR (area wise) is considered primary since we want to minimize the artifacts introduced during the fusion process. The FSR in the secondary image (i.e. with a larger FSR) need not be fused since the primary image contains that content already. If the larger region is to be aligned and fused then there is a higher chance of boundary artifacts. FIG. 5A shows what would be the primary image and FIG. 5B is the secondary image as it can be seen that the FSR in FIG. 5A is smaller than that in FIG. 5B.

For effective fusion of the information in two images, it is critical that the images are aligned to a fraction of line width.

A multi-resolution alignment technique is used to do this accurately only within the primary FSR (FIG. 5A and FIG. 5B). Since the dynamic ranges of two regions can be very different, histogram equalization is first applied on both image regions (hereafter referred as image $I_p$ (FIG. 5A) and $I_s$ FIG. 5B). The two images are then subsampled successively by a factor of two to produce a series of images of decreasing resolution. Image alignment is first carried out at the lowest resolution. The process involves finding the optimal warping function on secondary image that maximizes the cross-correlation between $I_p$ and $I_s$. The warping function from a given resolution is applied to $I_s$ at the next higher resolution to produce $I_{sa}$ (aligned secondary image). This step is critical to reducing computational cost, as it greatly prunes the search space of the optimization problem. The process is repeated as the module works its way towards aligning the highest resolution images.

Figure 6A:
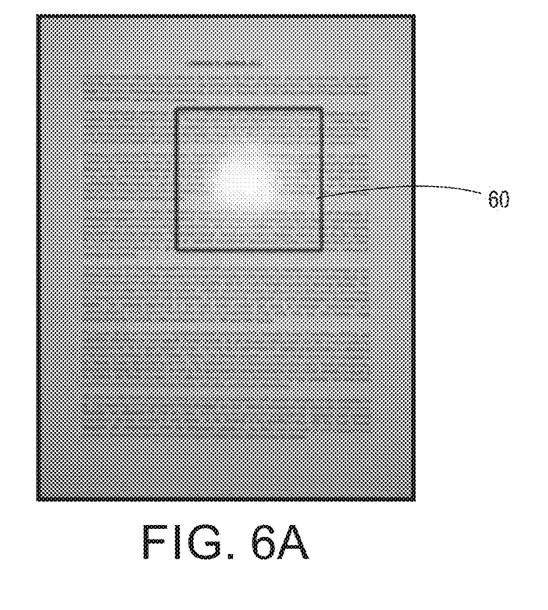
FIGS. 6A and 6B more particularly illustrate the processing techniques for the flash spot regions.

In FIG. 6A is shown the primary image with rectangular region 60 used for alignment ($I_p$). The region 62 in secondary image FIG. 6B corresponds to the FSR 60 in primary image ($I_s$). $I_s$ is aligned to $I_p$ using a multi-scale alignment method 40.

Figure 6B:
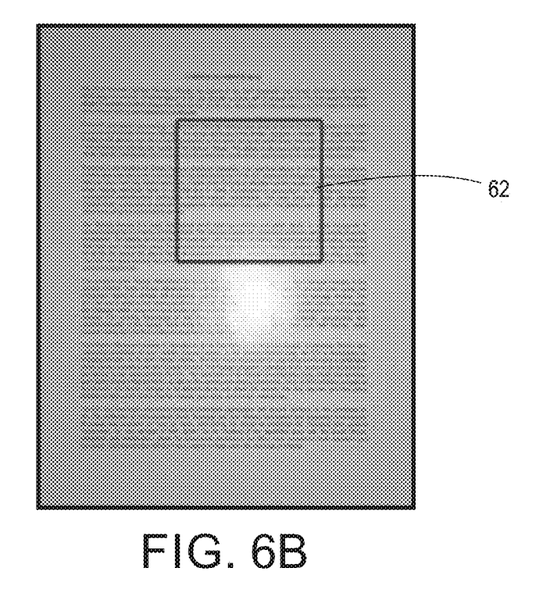

The aligned flash spot region of $I_s$ 62 and $I_p$ 60 is binarized 42 in the next step. In principle any binarization technique can be used. See Sauvola, J., and Matti P. "Adaptive document image binarization." *Pattern Recognition* 33.2 (2000): 225-236. In this approach the binarization threshold T is determined in a local adaptive fashion for each pixel, given by following equation:

$$T = m \times \left[1 + k \times \left(\frac{s}{R} - 1\right)\right]$$

where k is a user defined parameter, m and s are respectively the pixel mean and the standard deviation within a window of size w×w centered on the current pixel and R is the dynamic range of standard deviation. Parameters k and w are tuned heuristically for optimal subjective image quality, and separately for flash and no-flash images.

Figure 7A:
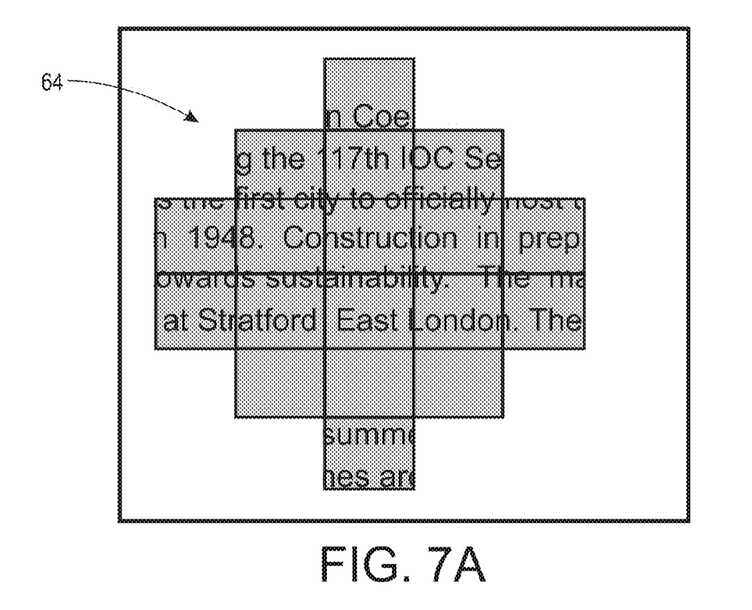
FIGS. 7A and 7B more particularly illustrate the processing techniques for the flash spot regions.
Figure 7B:
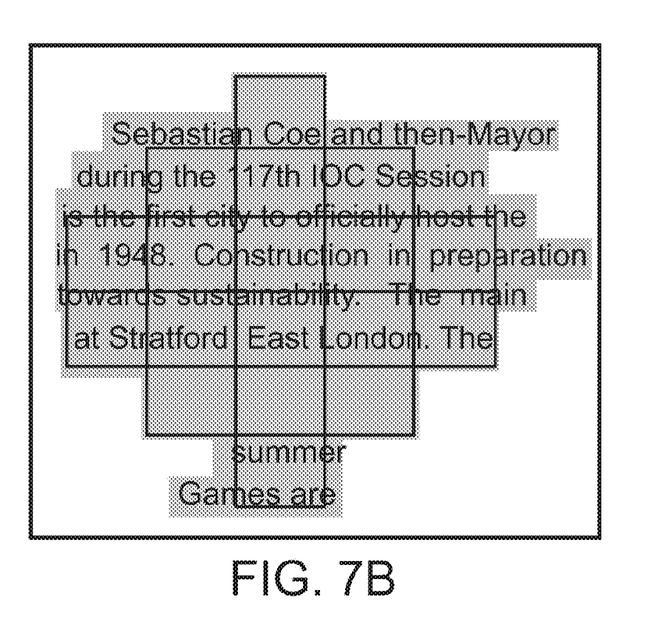

FIG. 7A shows an aligned $FSR_p$ 64 from the secondary image before fusion. In FIG. 7B it is aligned and is extended to avoid cutting of words so that the fusion artifacts are minimized. If a part of word comes from secondary image and its characteristics do not match well with the primary part then it is frequently detected as degradation.

In the final step, the contents in $FSR_s$ 60 are fused 46 with the $FSR_p$ 64. In order to further improve the quality of fused image, a novel FSR refinement step 44 is implemented before the fusion. The boundary of $FSR_s$ is first refined to avoid any splitting of characters and words in the image. Abrupt changes in the structural characteristics of words may be perceived as degradation of text, and may lead to a poor reading experience by user. A morphological operation (opening) is performed to connect characters to form words, and obtain connected-components (CCs) in the $FSR_s$. The CCs are then found which are only partially included in the $FSR_s$ and extended to the $FSR_s$ to include all such components entirely. In order to extend the FSR the secondary FSR obtained is expanded to a larger region before alignment and binarization. FIG. 7B illustrates the idea of extending the FSR to include complete words before fusion. The final binarized and fused image results. The quality within the FSR is much improved with the proposed technique since content is incorporated from images that are both captured with flash.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for low light image capture of a document image using a plurality of flash images from a single supplemental light source, the method comprising:
    first capturing a first image of a document with the supplemental light source wherein the first image has a first flash spot in a first flash spot region;
    second capturing a second image of the document with the supplemental light source wherein the second image has a second flash spot spaced from a position in the document of the first flash spot by a movement of the supplemental light source from a first position to a second position; and
    fusing the first and second images for an alignment of the first and second images to form a fused image, wherein the first flash spot region is replaced in the fused image with a corresponding portion of the second image wherein a boundary of the corresponding portion of the second image is selectively expanded to avoid splitting of characters and words by the fusing.

2. The method of claim 1 wherein the first and second capturing includes guiding the capturing to suggest a sufficient spacing of the first flash spot from the second flash spot.

3. The method of claim 2 wherein the guiding includes translating, rotating or augmented reality spacing of the first and second capturings, respectively.

4. The method of claim 3 wherein the guiding further includes previewing a preview display disposed to suggest the sufficient spacing.

5. The method of claim 1 further including detecting a first flash spot region and a second flash spot regions corresponding to the first and second flash spots, respectively, and assessing image degradation in the first flash spot region and a second flash spot region.

6. The method of claim 5 wherein the assessing includes determining the first image as a one of the first and second images having a lower image degradation; and the second image as having a higher image degradation.

7. The method of claim 6 wherein the fusing includes aligning a portion of the second image, corresponding to the flash spot region of the first image, with the first image.

8. The method of claim 7 wherein the aligning includes using a multi-scale alignment.

9. The method of claim 8 further including binarizing and fusing the first image and the aligned portion of the second image in an image area of the flash spot region of the first image.

10. A low light image capture system for capturing a document image using a plurality of flash images, the system comprising:
 a capture device including a single supplemental light source for first capturing a first image of a document wherein the first image has a first flash spot in a first flash spot region, and for second capturing a second image of the document with the supplemental light source upon a movement of the supplemental light source from a first position to a second position wherein the second image has a second flash spot spaced from a position in the document of the first flash spot; and
 a processor for fusing the first and second images for an alignment of the first and second images to form a fused image, wherein the first flash spot region is replaced in the fused image with a corresponding portion of the second image and wherein a boundary of the second image is selectively expanded to avoid splitting of characters and words by the fusing.

11. The system of claim 10 wherein the capture device includes a guide to suggest a sufficient spacing of the first flash spot from the second flash spot.

12. The system of claim 11 wherein the guide includes a user assist for translating, rotating or augmented reality spacing of the first and second capturings, respectively.

13. The system of claim 12 wherein the guide comprises a preview display disposed to suggest the sufficient spacing.

14. The system of claim 10 wherein the processor detects a first flash spot region and a second flash spot region corresponding to the first and second flash spots, respectively, and assesses image degradation in the first flash spot region and a second flash spot region.

15. The system of claim 14 wherein the processor assessing includes determining the first image as a one of the first and second images having a lower image degradation, and the second image as having a higher image degradation.

16. The system of claim 15 wherein the processor fusing includes aligning a portion of the second image, corresponding to the flash spot region of the first image, with the first image.

17. The system of claim 16 wherein the processor aligning includes using a multi-scale alignment.

18. The system of claim 17 wherein the processor aligning further includes binarizing for fusing the first image and the aligned portion of the second image in an image area of the flash spot region of the first image.

* * * * *